United States Patent [19]
Mays

[11] Patent Number: 5,503,562
[45] Date of Patent: Apr. 2, 1996

[54] ENDODONTIC INSPECTION BLOCK

[76] Inventor: Ralph C. Mays, 5436 S. Mingo Rd., Tulsa, Okla. 74146

[21] Appl. No.: 386,424

[22] Filed: Feb. 10, 1995

[51] Int. Cl.⁶ .................................................. G09B 23/28
[52] U.S. Cl. ........................................... 434/263; 434/262
[58] Field of Search ...................... 434/262, 263, 434/266, 272, 296, 297, 370; 433/102; 206/63.5

[56] References Cited

U.S. PATENT DOCUMENTS

| | | |
|---|---|---|
| 1,967,786 | 7/1934 | Schulz . |
| 3,911,587 | 10/1975 | Forrest et al. ............... 433/102 X |
| 3,947,967 | 4/1976 | Satake . |
| 4,102,047 | 7/1978 | Walker . |
| 4,137,633 | 2/1979 | Kahn . |
| 5,320,529 | 6/1994 | Pompa .................. 434/263 X |

FOREIGN PATENT DOCUMENTS

| | | | |
|---|---|---|---|
| 1439666 | 11/1988 | U.S.S.R. ................... 434/263 |

*Primary Examiner*—Gene Mancene
*Assistant Examiner*—Jeffrey A. Smith
*Attorney, Agent, or Firm*—Head, Johnson & Kachigian

[57] ABSTRACT

An improved inspection block for use in endodontia training in the form of a block of transparent material having a root canal emulating cavity therein extending from the top towards the block bottom, the cavity opening at the block top so that an endodontic file may be positioned in the cavity whereby a student may replicate manipulation of the file in the cavity to practice the art of cleaning and preparing a root canal, the block having at least one side wall surface configured to optically magnify the root canal.

4 Claims, 2 Drawing Sheets

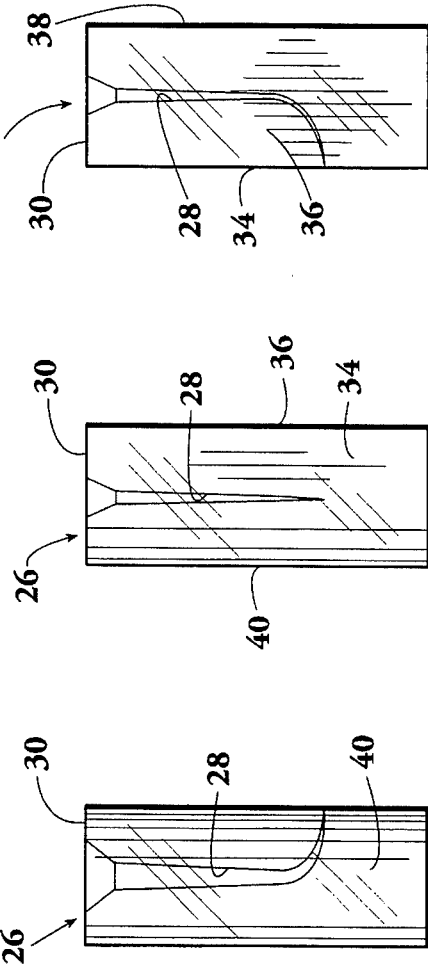

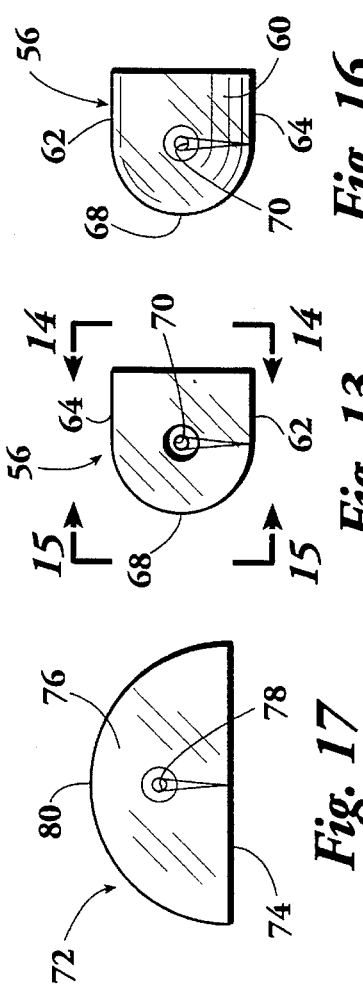
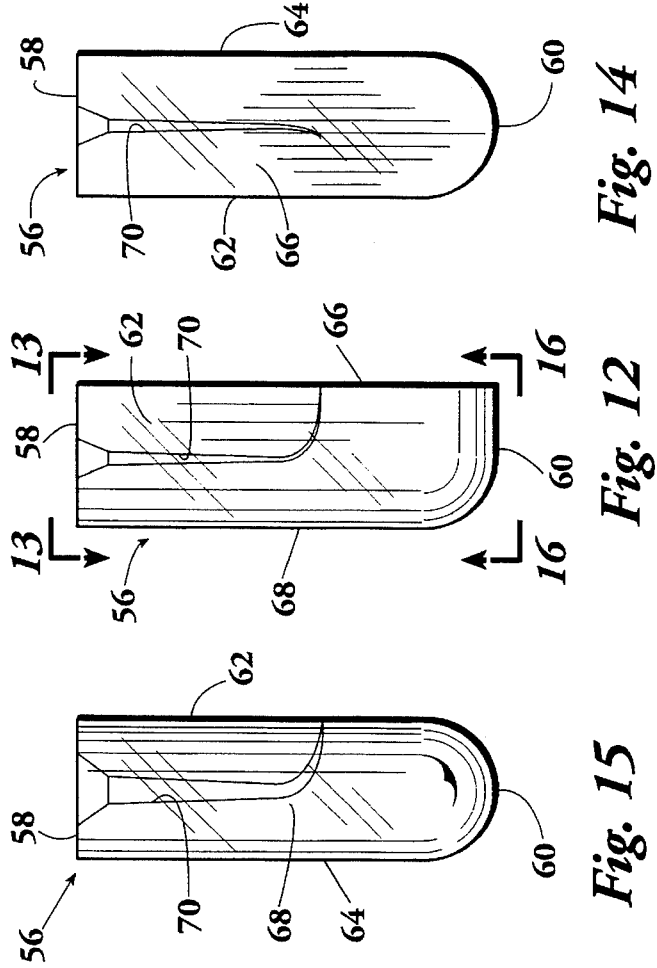
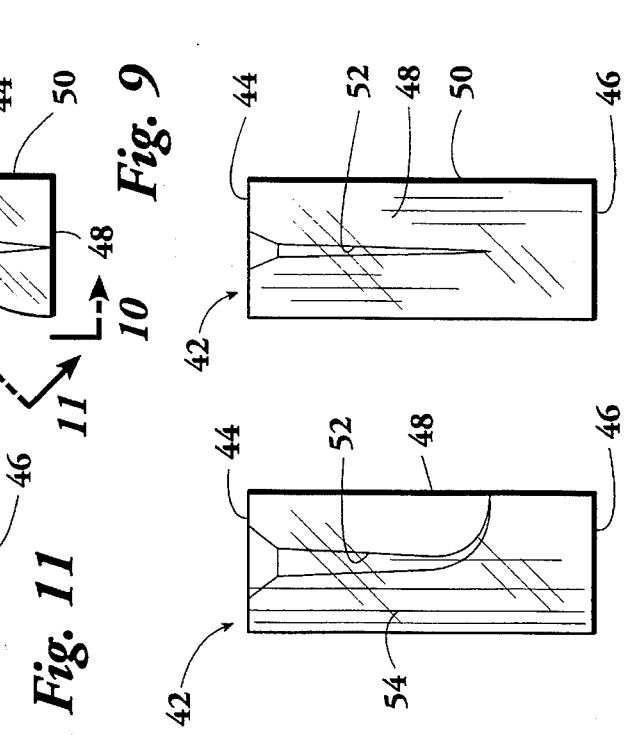
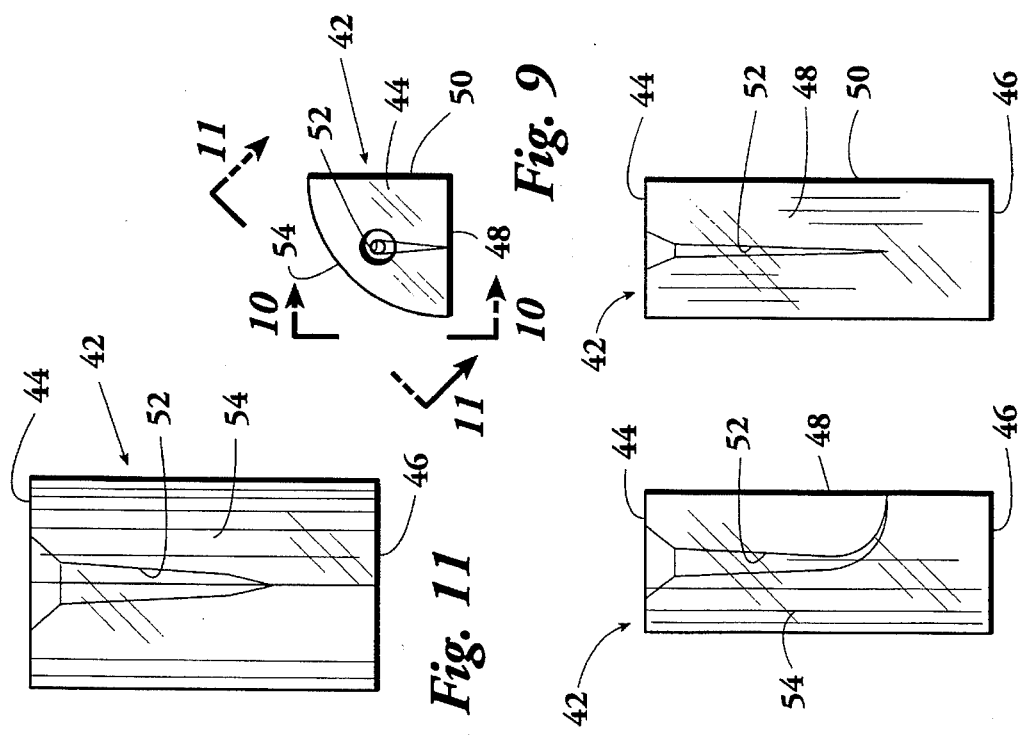

5,503,562

ENDODONTIC INSPECTION BLOCK

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

The techniques of endodontia are becoming more important to students learning the art of dentistry. In recent years great progress has been made in endodontia and because of it, dentists are frequently able to preserve teeth even after they have become abscessed, that is, after the root canal of the tooth becomes infected. To preserve an abscessed tooth, the dentist or endodontist must carefully and completely remove the nerve structure and pulp before filling the root cavity with a filler material, such as gutta percha. If any vestige of the root canal or pulp material remains in a tooth, it is subject to becoming infected and, therefore, the careful cleaning and shaping of a root canal is a most critical part in any endodontic procedure. To provide a means for students to practice cleaning and shaping root canals, others have suggested the provision of root canal practice models. An early example of a device for use in practicing endodontia procedures is set forth in U.S. Pat. No. 3,947,967 entitled "Root Canal Model For Use In Practicing Dental Art Training". This patent teaches the formation of a block of transparent material having a cavity in it conforming to the typical shape of a root canal. The cavity can be filled with a material and the student can practice the art of cleaning the root canal. By making the block of transparent material, the student is able to observe the process as it is practiced and to visually determine when the artificial root canal has been thoroughly cleaned and shaped.

U.S. Pat. No. 4,137,633 entitled "Root Canal Practice Model" shows a variation of the basic root canal practice block by providing a plug of a resilient mass located at the root canal apex so that the student can determine tactically when a file has reached the root canal apex.

BRIEF SUMMARY OF THE INVENTION

The present invention provides for an improved device for use in study of endodontic procedures. The invention is in the form of a block of transparent material. The block has a top, bottom, and side walls. A cavity emblematic of a typical root canal of a typical human tooth is formed in the block, extending from the top towards the bottom. The cavity opens at the top so that filler material may be deposited in the cavity. Thereafter, a student may, by use of endodontic files, practice the art of cleaning and shaping the cavity. In this practice, the student replicates the manipulation of files in the cavity as would occur in cleaning an actual cavity in an actual tooth of a patient.

The block containing the cavity is transparent so the student can observe the process of cleaning the cavity and the final results of the cleaning effort. To augment the visual inspection of the cavity and the results of endodontia-type procedures carried out in the cavity, by the technique of this disclosure, at least one side wall of the block is configured to optically magnify the root canal. In a preferred embodiment of the invention, at least one side wall is flat so as to provide an undistorted view of the actual cavity size and configuration and at least one other side has a curved outer surface providing for magnification of the view of the cavity. This magnified view enables a student to more effectively visually perceive changes in the shape and cleanliness of the cavity as the student employs files to replicate the action that takes place in cleaning an actual cavity in an actual tooth.

A better understanding of the invention will be obtained from the following description of the preferred embodiments taken in conjunction with the attached drawings.

DESCRIPTION OF THE DRAWINGS

FIG. 1 is an elevational external view of a prior art root canal practice model, the model being in the form of a block of clear plastic material, such as acrylic, having a cavity formed in the block that can be viewed from the exterior of the block.

FIG. 2 is an elevational side view of the prior art root canal practice model of FIG. 1.

FIG. 3 is a top plan view of the prior art root canal practice block of FIGS. 1 and 2.

FIG. 4 is a front elevational view of a root canal practice block of the present invention. It is in the form of a clear plastic block having a replicated root canal formed therein and configured to present a magnified view of the root canal.

FIG. 5 is a top plan view of the practice model of FIG. 4 showing that one side of the model is rounded while three sides are planar.

FIG. 6 is an elevational view of the model of FIGS. 4 and 5, taken along the line 6—6 of FIG. 5, and providing an undistorted view of the root canal within the transparent block.

FIG. 7 is an elevational view of the practice block taken along the line 7—7 of FIG. 5, showing a magnified view of the root canal.

FIG. 8 is an elevational view of a root canal practice model having an alternate embodiment.

FIG. 9 is a top plan view of the root canal practice model of FIG. 8. FIGS. 8 and 9 show undistorted views of the root canal that is formed within the block.

FIG. 10 is an elevational side view as taken along the line 10—10 of FIG. 9 wherein the shape of the block of transparent material causes a magnified view of the root canal.

FIG. 11 is an elevational side view as taken along the line 11—11 of FIG. 9 showing a different magnified view of the root canal.

FIGS. 12–15 show another alternate embodiment of the invention. FIG. 12 is an elevational side view of a root canal practice model made of a block of transparent material having a root canal therein.

FIG. 13 is a top plan view as taken along the line 13—13 of FIG. 12.

FIG. 14 is a front elevational view taken along the line 14—14 of FIG. 13 showing an undistorted view of the root canal.

FIG. 15 is an elevational view of the opposite side wall as taken along the line 15—15 showing a magnified view of the root canal.

FIG. 16 is a bottom view of the root canal practice block as taken along the line 16—16 of FIG. 12 showing a magnified end view of the root canal.

FIG. 17 is a top plan view of still a different alternate embodiment of the invention showing that the block can be formed with one side and the other side wall being in the form of 180° arc.

In summary, FIGS. 4 through 7 show the embodiment of the invention wherein the block has three flat side walls and one arcuate side wall; FIGS. 8 through 11 show an embodiment of the invention wherein the block has two flat side walls and one arcuate side wall; FIGS. 12 through 16 show an embodiment of the invention wherein the block has three flat side walls, an arcuate side wall and an arcuate bottom; and FIG. 17 shows an embodiment of the invention having a single flat side wall and an arcuate side wall.

DETAILED DESCRIPTION OF THE PREFERRED EMBODIMENTS

Referring first to FIGS. 1, 2 and 3, a commercially available root canal practicing model is illustrated as being representative of the state of the prior art. The commercially available model of FIGS. 1, 2, and 3 is a block 10 of clear plastic material, such as acrylic, that is molded to have a replica of a root canal 12 formed in the block. Root canal 12 communicates with block top 14 and extends toward the bottom 16. As shown in the top view of FIG. 3, the root canal 12 extends in the direction towards one side wall 18. The other side walls are indicated by the numerals 20, 22 and 24.

Block 10 of FIGS. 1, 2 and 3 has six sides and all six sides present an undistorted view of the root canal, that is, there is no magnification of the root canal regardless of which of the six sides of the block is used to view the root canal. Of course, viewing the root canal from the top, as shown in FIG. 3, provides a direct view into the root canal but the essential aspect of the practice block of FIGS. 1, 2 and 3 is that the root canal is viewable through the acrylic block without magnification.

A first embodiment of the present invention is shown in FIGS. 4 through 7. Block 26 of clear plastic, such as acrylic, has a root canal 28 therein and has a top 30, bottom 32, and three planar side walls 34, 36 and 38. One side wall 40 is arcuate or preferably semi-circular so that, as shown in FIG. 7, a magnified view of the root canal is seen.

The essence of the invention is that when a root canal model is formed of transparent plastic, improved observation of a root canal and any work done on it by a student can be obtained by making at least one of the external surfaces of the block configured to provide magnification.

FIGS. 8 through 11 show another embodiment of the invention in which a block 42 has a top 44, bottom 46 and planar side walls 48 and 50 with a root canal 52 formed in the block. An arcuate side wall 54 connects planar side walls 48 and 50. When the root canal is viewed through arcuate side wall 54, magnification is provided. FIG. 10 shows magnification when the root canal is viewed along the line 10—10 of FIG. 9. Magnification from a different perspective is obtained when the root canal is viewed along the line 11—11 of FIG. 9 as illustrated in FIG. 11.

FIGS. 12 through 16 show a third embodiment of the invention in which a transparent block 56 has a top surface 58, bottom surface 60, a front side wall 62, a back side wall 64, another side wall 66 and an arcuate side wall 68. The block contains a root canal 70 as previously described. The top and the side walls of the embodiment of FIGS. 12 through 16 are substantially identical to the top and the side walls of the embodiment of FIGS. 4 through 7. A difference however is in the configuration of bottom 66. Whereas in the previously described blocks, each bottom surface is flat whereas in this third embodiment the bottom surface 60 is curved as shown in FIGS. 12, 14 and 15. FIG. 16 is an end view of the curved bottom 60. By providing curvature of the surface of bottom 60, the view of the root canal 70 is enlarged compared to the view as seen when looking at the top surface 58.

FIG. 17 is a top view of a fourth embodiment. Only the top view is shown since it is understood that the embodiment represented by FIG. 17 has the same characteristics as the previously described embodiments except that block 72 has only one planar side wall 74. The embodiment of FIG. 17 has a top surface 76 and a bottom surface not illustrated. The block has a root canal 78 formed therein as previously described. The embodiment of FIG. 17 is different than the others in that it employs only one planar surface 74 and a semi-circular arcuate side wall surface 80. Thus, the embodiment of FIG. 17 provides facilities for viewing the root canal 78 through the planar side walls 74 to obtain a non-distorted view of the root canal 78 whereas magnified views of the root canal can be obtained by observing the root canal through the arcuate side wall 80.

The four embodiments of the invention can be characterized in this way. The first embodiment shown in FIGS. 4 through 7 provides three planar side walls and one arcuate side wall and a planar bottom. The embodiment of FIGS. 8 through 11 provides two planar side walls, one arcuate side wall and a planar bottom. The embodiment of FIGS. 12 through 16 provides three planar side walls, one arcuate side wall and an arcuate bottom. The embodiment of FIG. 17 provides one planar side wall and one arcuate side wall, the bottom which is not illustrated may be planar or arcuate.

Since the concept of this invention is practiced by changing the external configuration of a block of clear plastic of which the device is made, the additional expense compared to a standard square sided block as illustrated in FIGS. 1 through 3 is very nominal. In other words, for a very nominal additional expense, not requiring any substantial increase in the quantity of clear plastic required to make a root canal model for use by endodontia students, the model can be made to better illustrate to the student changes in the root canal as the student practices the art of cleaning and shaping a root canal.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A device for use in the study of endodontia comprising:
    a block of transparent material having a top, bottom, side walls and a means representing a root canal comprising a cavity in said block extending from the top towards the bottom, the cavity opening at the block top so that an endodontic file may be positioned in the cavity whereby a student may replicate manipulation of the file in the cavity to practice the art of cleaning and preparing the root canal, the block having at least one surface comprising means for magnifying said root canal and at least one other surface that comprises means for permitting an undistorted view of said root canal.

2. A device according to claim 1 wherein said means for magnifying said root canal comprises a curved side wall surface and said means for permitting an undistorted view of said root canal comprises a fiat side wall surface.

3. A device according to claim 2 wherein said block has two planar sides and said means for magnifying said root canal comprises an arcuate side wall surface.

4. A device according to claim 2 wherein said block has three planar sides and said means for magnifying said root canal comprises an arcuate side wall surface.

* * * * *